(12) United States Patent
Kim (10) Patent No.: US 10,381,892 B2
(45) Date of Patent: Aug. 13, 2019

(54) STATOR ASSEMBLY, MOTOR HAVING THE SAME AND METHOD OF MANUFACTURING THE SAME

(71) Applicant: LG Innotek Co., Ltd., Seoul (KR)

(72) Inventor: Chan Seok Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 273 days.

(21) Appl. No.: 14/982,632

(22) Filed: Dec. 29, 2015

(65) Prior Publication Data

US 2016/0190888 A1 Jun. 30, 2016

(30) Foreign Application Priority Data

Dec. 29, 2014 (KR) .................. 10-2014-0192404

(51) Int. Cl.
*H02K 3/50* (2006.01)
*H02K 3/52* (2006.01)

(52) U.S. Cl.
CPC .............. *H02K 3/522* (2013.01); *H02K 3/50* (2013.01); *H02K 2203/09* (2013.01)

(58) Field of Classification Search
CPC ...... H02K 2203/09; H02K 3/28; H02K 3/522; H02K 3/50
USPC ........................................ 310/43, 71
See application file for complete search history.

(56) References Cited

U.S. PATENT DOCUMENTS

| | | | | |
|---|---|---|---|---|
| 5,073,735 A * | 12/1991 | Takagi | ............ | H02K 5/04 310/194 |
| 6,600,244 B2 * | 7/2003 | Okazaki | ............ | H02K 3/522 310/71 |
| 6,914,356 B2 * | 7/2005 | Yamamura | ............ | H02K 3/50 310/71 |
| 7,514,829 B2 * | 4/2009 | Otsuji | ............ | H01R 25/161 310/71 |

(Continued)

FOREIGN PATENT DOCUMENTS

| EP | 2352220 A2 | 8/2011 |
|---|---|---|
| WO | WO-2014061276 A1 | 4/2014 |
| WO | WO-2014195642 A1 | 12/2014 |

OTHER PUBLICATIONS

Extended European Search Report dated Jun. 9, 2016 in European Application No. 15202863.5.

(Continued)

*Primary Examiner* — Burton S Mullins
(74) *Attorney, Agent, or Firm* — Saliwanchik, Lloyd & Eisenschenk (57) ABSTRACT

A stator assembly, a motor having the same, and a method of manufacturing a stator assembly are provided. The stator assembly includes a stator core, coils wound around the stator core, and a stator body including a first power terminal, a neutral terminal configured to connect the coils and connected to the first power terminal, and a bearing, wherein each of a connection terminal of the first power terminal and a hole of the bearing is exposed externally, thereby providing an advantage for simplifying an assembly process by reduction of the number of components and simplification of a structure. Further, a useless space is removed by the above process, thereby providing an advantage for reducing the size of a product and reducing the weight thereof.

13 Claims, 6 Drawing Sheets

(56) References Cited

U.S. PATENT DOCUMENTS

| | | | | |
|---|---|---|---|---|
| 7,663,287 | B2* | 2/2010 | Haga | H02K 3/325 |
| | | | | 310/260 |
| 8,035,263 | B2* | 10/2011 | Kienzler | H02K 3/522 |
| | | | | 310/179 |
| 8,471,419 | B2* | 6/2013 | Shimomura | H02K 1/148 |
| | | | | 29/596 |
| 8,519,583 | B2* | 8/2013 | Sakaue | H02K 3/522 |
| | | | | 310/184 |
| 9,079,603 | B2* | 7/2015 | Isshiki | B62D 5/0403 |
| 9,735,639 | B2* | 8/2017 | Shim | H02K 3/28 |
| 2007/0278876 | A1 | 12/2007 | Haga et al. | |
| 2009/0039720 | A1* | 2/2009 | Tsukashima | H02K 3/522 |
| | | | | 310/71 |
| 2011/0018376 | A1* | 1/2011 | Kataoka | H02K 3/522 |
| | | | | 310/71 |
| 2011/0133581 | A1* | 6/2011 | Ha | H02K 3/522 |
| | | | | 310/71 |
| 2014/0091655 | A1* | 4/2014 | Kajita | H02K 3/522 |
| | | | | 310/71 |
| 2016/0020660 | A1* | 1/2016 | Houzumi | H02K 3/522 |
| | | | | 310/71 |

OTHER PUBLICATIONS

Office Action dated Dec. 11, 2018 in Chinese Application No. 201511017424.X.

* cited by examiner

STATOR ASSEMBLY, MOTOR HAVING THE SAME AND METHOD OF MANUFACTURING THE SAME

CROSS-REFERENCE TO RELATED APPLICATION

This application claims the benefit under 35 U.S.C. § 119 of Korean Patent Application No. 10-2014-0192404, filed Dec. 29, 2014, which is incorporated by reference in its entirety.

BACKGROUND

Field of the Invention

The present invention relates to a stator assembly, a motor having the same and a method of manufacturing the stator assembly, and more particularly, to a stator assembly including a busbar on a stator, a motor having the same, and a method of manufacturing the stator assembly.

Discussion of Related Art

A motor is a device which converts electric energy to rotational energy using the force of a conductor generated in a magnetic field. A general motor includes a rotatable shaft, rotors coupled to the shaft, and a stator fixed in a housing. The stator is installed along the circumferences of the rotors with gaps. Further, coils are wound around the stator to form a rotating magnetic field.

In a stator made by a partitioned core method, busbars in a ring shape are provided on the stator to connect the coils in parallel. The coils of the stator can be electrically connected to the busbars through coil terminals. Power terminals respectively connected to power sources having different polarities and neutral terminals for connecting the coils are provided on the busbars. The power terminals are connected to the neutral terminals and the neutral terminals are connected to connection terminals of the coils by fusing, respectively.

After the busbars are assembled on the stator, bearings are pressed on and inserted into a cover of the rear of the housing, and the rotors are assembled. Then, the housing is bolt-coupled in a final stage of the assembly process.

However, when reviewing a series of the assembly process, the assembly process is complex due to a number of components and a complex structure.

BRIEF SUMMARY

The present invention is directed to providing a stator assembly having few components and made by a simple assembly process due to a simple structure, a motor having the same, and a method of manufacturing the stator assembly.

Additional aspects of the invention will be set forth in part in the description which follows and, in part, will be obvious from the description, or may be learned by practice of the invention One aspect of the present invention provides a stator assembly including a stator core, coils wound around the stator core, and a stator body including a first power terminal, a neutral terminal configured to connect the coils and connected to the first power terminal, and a bearing, wherein each of a connection terminal of the first power terminal and a hole of the bearing is exposed externally.

An insulator may be mounted on the stator core and the coils may be wound around the insulator.

The insulator may include a first slot into which the first power terminal is inserted.

The insulator may include a second slot into which the neutral terminal is inserted.

The connection terminal of the first power terminal may be exposed on an upper surface of the stator body.

A second power terminal connected to the first power terminal may be disposed on the upper surface of the stator body.

The stator body may include a third slot formed on the upper surface thereof and the first power terminal may be inserted into the third slot.

The stator body may be formed by molding so that a hollow portion in communication with the hole of the bearing is formed.

Another aspect of the present invention provides a motor including a stator assembly including a stator core, coils wound around the stator core, a neutral terminal configured to connect a first power terminal and the coils and connected to the first power terminal, and a bearing, wherein each of a connection terminal of the first power terminal and a hole of the bearing is exposed externally, a rotor disposed on an inner side of the stator assembly; and a shaft coupled to the rotor.

An insulator may be mounted on the stator core and the coils are wound around the insulator.

The insulator may include a first slot into which the first power terminal is inserted.

The insulator may include a second slot into which the neutral terminal is inserted.

The connection terminal of the first power terminal may be exposed on an upper surface of the stator body.

A second power terminal connected to the first power terminal may be disposed on the upper surface of the stator body.

The stator body may include a third slot formed on the upper surface thereof and the first power terminal is inserted into the third slot.

Still another aspect of the present invention provides a method of manufacturing a stator assembly, including a) winding a coil around an insulator of a stator core, b) inserting a first power terminal and a neutral terminal into the insulator, c) fusing the coil and the neutral terminal, and d) molding to cover a bearing, the stator core, the coil, the neutral terminal, and the first power terminal, wherein a connection terminal of the first power terminal, a connection terminal of the neutral terminal, and a hole of the bearing each are exposed externally.

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which.

DETAILED DESCRIPTION

Hereinafter, exemplary embodiments of the present invention will be described in detail with reference to the accompanying drawings. Additional objects, features and operational advantages, including the object, constitution and effects of the present invention, will become more apparent from the detailed description of the preferred embodiments. Further, the terms or words used in the specification and claims are not to be interpreted by their typical or dictionary meanings but their meanings and concepts should be construed in conformity with the technical idea of the invention, based on the principle that the inventor can properly define the concepts of the terms to explain the invention in the best manner. Further, in the following description of the present invention, a detailed description of known functions and configurations incorporated herein will be omitted when it may make the subject matter of the present invention rather unclear.

Figure 1:
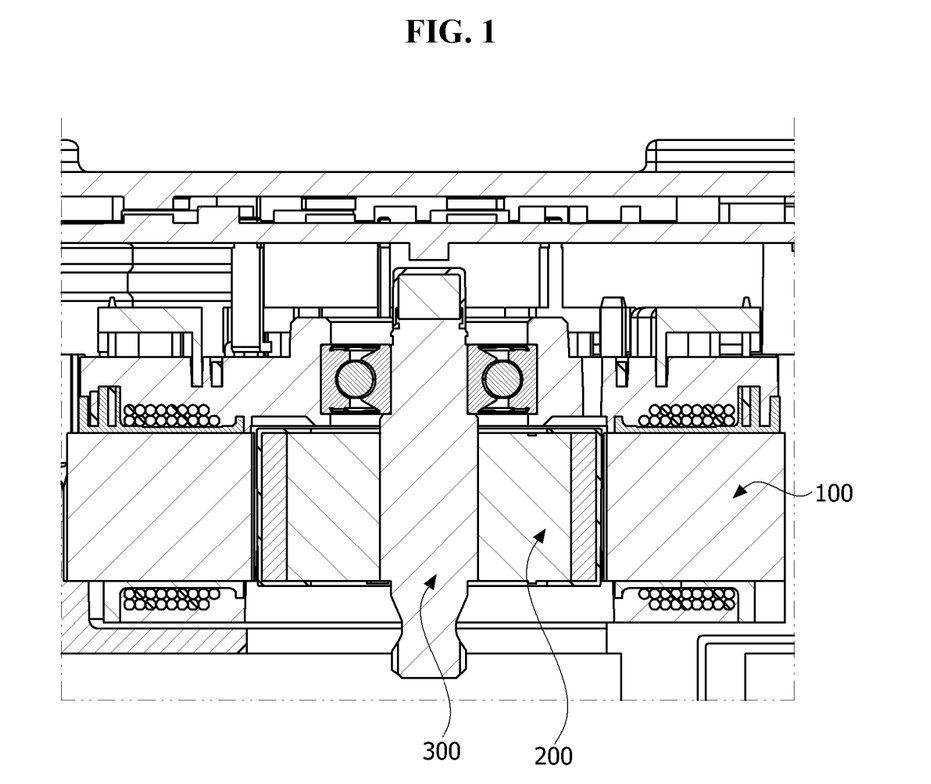
FIG. 1 is a view illustrating a motor according to an exemplary embodiment of the present invention.
Figure 2:
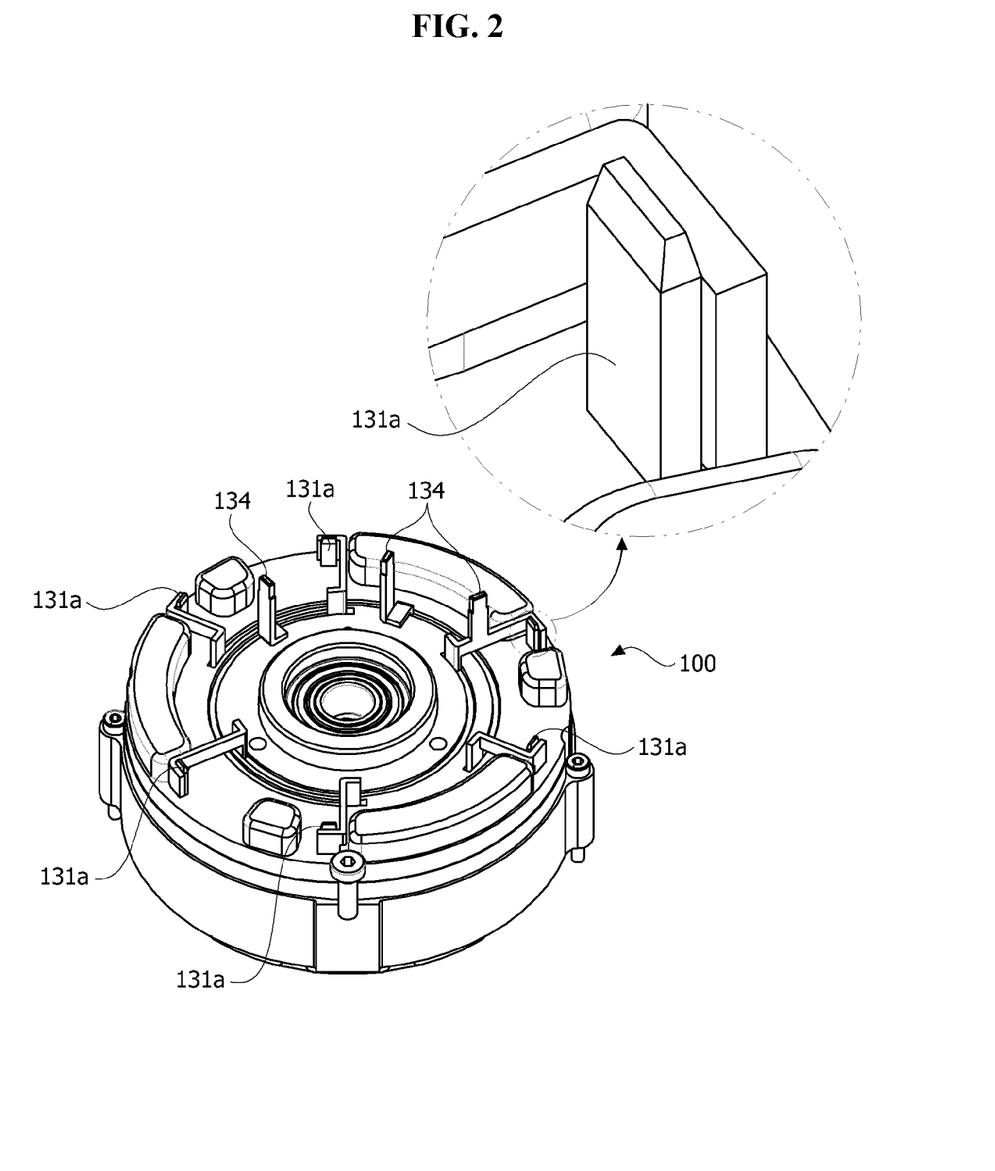
FIG. 2 is a view illustrating a stator assembly shown in FIG. 1.
Figure 3:
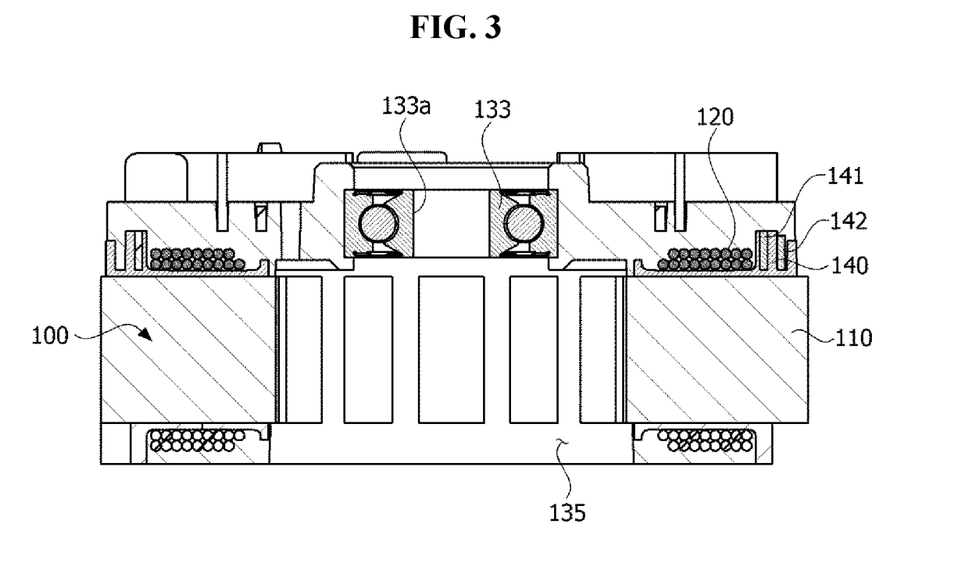
FIG. 3 is a cross-sectional view of the stator assembly shown in FIG. 1.
Figure 4:
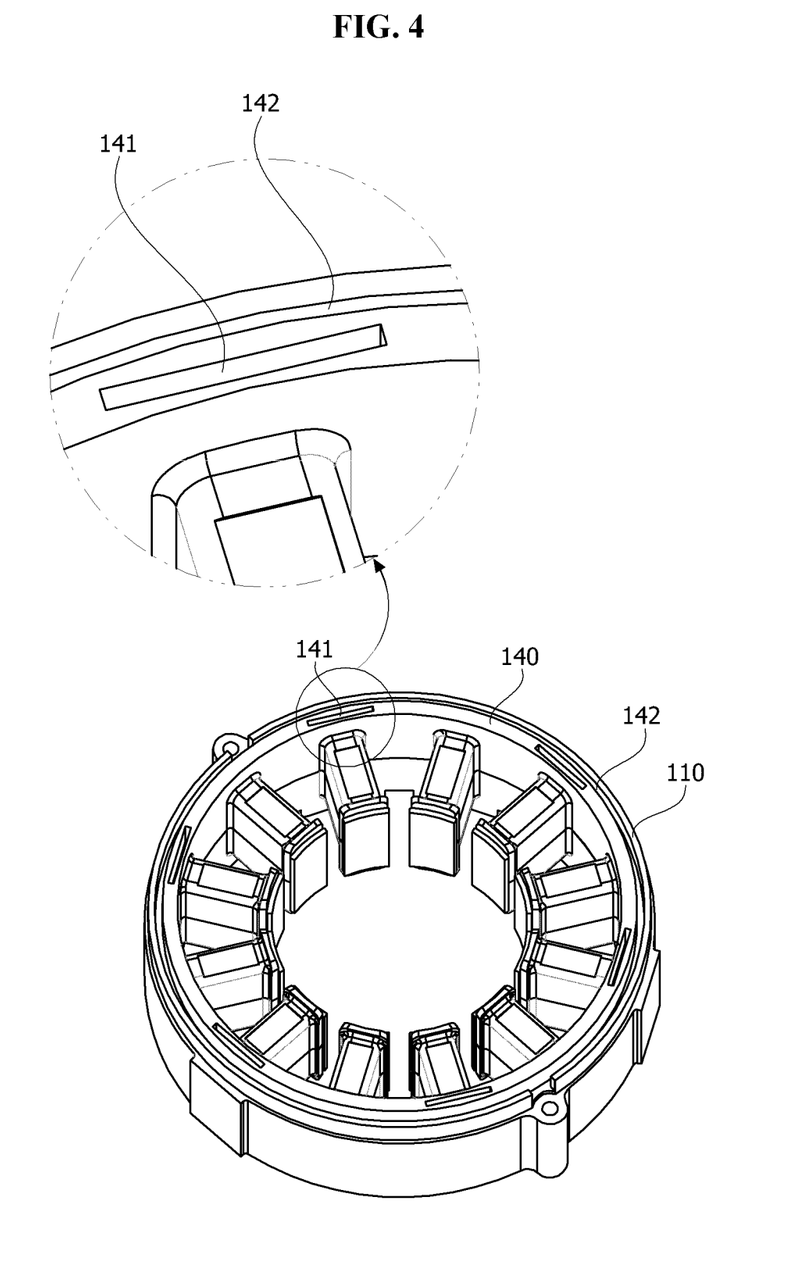
FIG. 4 is a view illustrating first slots and second slots formed on an insulator.

FIG. 1 is a view illustrating a motor according to an exemplary embodiment of the present invention, FIG. 2 is a view illustrating a stator assembly shown in FIG. 1, FIG. 3 is a cross-sectional view of the stator assembly shown in FIG. 1, and FIG. 4 is a view illustrating first slots and second slots formed on an insulator.

Referring to FIGS. 1 to 4, the motor according to the exemplary embodiment of the present invention may include a stator assembly 100, rotors 200, and a shaft 300.

The rotors 200 are disposed on an inner side of the stator assembly 100. The rotor 200 may be formed so that a magnet is coupled to a rotor core, and alternatively, the rotor core and the magnet may be formed integrally. Further, the rotor 200 may be formed so that the magnet is coupled to an outer circumferential surface of the rotor core, or may be formed so that the magnet is inserted into a pocket of the rotor core. A sensing magnet for obtaining location information of the rotor 200 may be coupled to and installed on a plate above the rotor 200, or a rotor location detection unit similar thereto may be installed. The rotor 200 accommodated inside the stator assembly 100 may be installed rotatably. When a current is supplied to the stator assembly 100, electrical interaction with the rotor 200 is induced to derive the rotation of the rotor 200. When the rotor 200 rotates, the shaft 300 is rotated to provide power.

The stator assembly 100 may include a stator core 110, coils 120, a stator body 130, and insulators 140.

The stator core 110 may be formed with a yoke portion in a ring shape and a plurality of steel plates which are disposed in a circumference direction, each include a stator teeth portion protruding from the yoke portion to an inner side of a diameter direction with equiangular gaps, and are stacked. The coils 120 for generating a rotating magnetic field are wound around the stator teeth. Here, the coils 120 may be insulated by the insulator 140.

The insulators 140 are respectively coupled to an upper side and a lower side of the stator core 110 to serve as insulating the coils 120 wound around the stator teeth from the stator core 110 to prevent electrical connection therebetween. The insulator 140 may be formed of a resin material. An outer portion and an inner portion may be respectively provided on an outer circumferential surface and an inner circumferential surface of the insulator 140 so as to prevent the departure of the coils 120 and guide a winding location.

Referring to FIG. 4, first slots 141 and second slots 142 may be lengthily formed in the insulator 140 in a circumference direction. Specifically, the first slots 141 may be formed on an upper surface of a body of the insulators 140 formed in a ring shape with a constant width. As the first slot 141 is a slot into which a first power terminal 131 (see FIG. 5) is inserted, The first slots 141 may be formed with totally six slots which correspond to the number of first power terminals 131 (see FIG. 5). However, in the present invention, the number of the first slots 141 is not limited to the six slots.

The second slot 142 may be formed on the upper surface of the body of the insulators 140 with a constant width to be located at an outer side than the first slot 141 based on a circumference direction. The second slot 142 is a slot into which a neutral terminal 132 (see FIG. 5) for connecting the coils 120 is inserted, and is formed to be longer than the first slot 141. The second slots 142 may be formed with totally three slots which correspond to the number of neutral terminals 132 (see FIG. 5). However, in the present invention, the number of the second slots 142 is not limited to the three slots.

Figure 5:
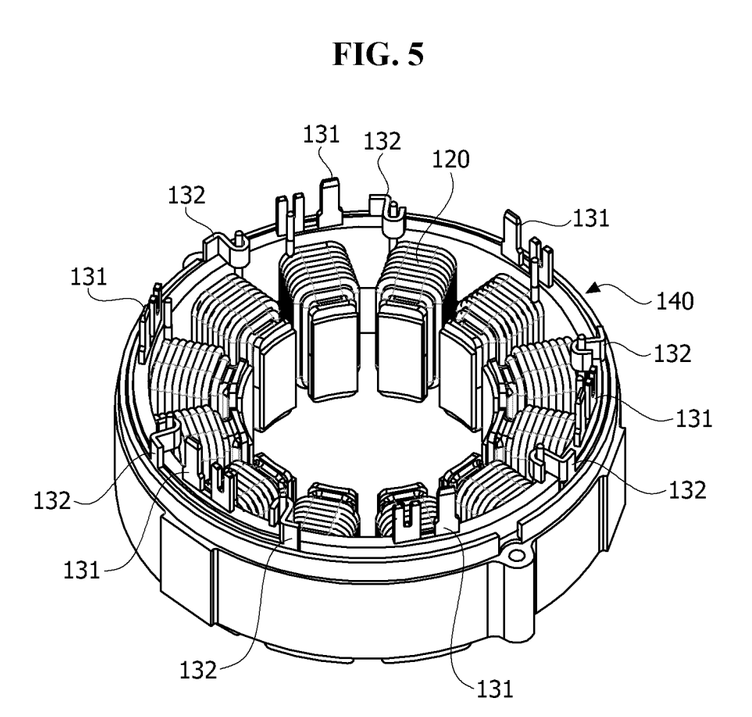
FIG. 5 is a view illustrating first power terminals and neutral terminals respectively mounted in the first slots and the second slots of the insulator.

FIG. 5 is a view illustrating first power terminals and neutral terminals respectively mounted in the first slots and the second slots of the insulator.

The motor according to the exemplary embodiment of the present invention may include busbars on the stator body 130. Referring to FIG. 5, the busbars are for connecting the coils 120 disposed in parallel and are electrically connected to the coils 120. To this end, the first power terminals 131 and the neutral terminals 132 are provided. The first power terminal 131 is inserted into the first slot 141 and the neutral terminal 132 is inserted into the second slot 142.

Here, the first power terminal 131 is connected to the neutral terminal 132 by fusing and is connected to each phase (U, V, and W) of three phase power. The neutral terminal 132 is for connecting the coils 120 to be parallel and may be connected to a terminal of each coil by fusing.

The neutral terminals 132 are disposed in a circumference direction and each neutral terminal 132 may be connected to an end portion of the first power terminal 131.

As shown in FIG. 5, when molding is performed in a state in which the coils 120 are wound around the insulator 140, the first power terminals 131 and the neutral terminals 132 are mounted, and bearings 133 (see FIG. 3) are installed, the stator body 130 (see FIG. 2) is formed. At this time, the molding is performed so that connection terminals of the first power terminals 131 and holes 133a (see FIG. 3) of the bearing 133 (see FIG. 3) are exposed externally.

Thus, the first power terminals 131 and the neutral terminals 132, serving as busbars, in addition to the stator core 110, the coils 120, and the insulator 140 are integrally included in the stator body 130 formed by the molding so as to be a single device. Here, hollow portions 135 (see FIG. 3) into which the rotors 200 are inserted are formed in the center portion of the stator body 130.

As shown in FIG. 2, after the stator body 130 is formed, the connection terminal 131a of the first power terminal 131 is exposed to the outside of an upper surface of the stator body 130. Second power terminals 134 to be respectively connected to the connection terminals 131a of the first power terminals 131 (see FIG. 5) are mounted on the upper surface of the stator body 130.

The second power terminals 134 may be provided with totally three terminals, and when two terminals among the three terminals are respectively connected to two connection terminals 131a of the first power terminals 131 which are disposed to face the two terminals, the remaining terminal may be connected to external power. The present invention is not limited that the number of the second power terminals 134 is three.

Figure 6:
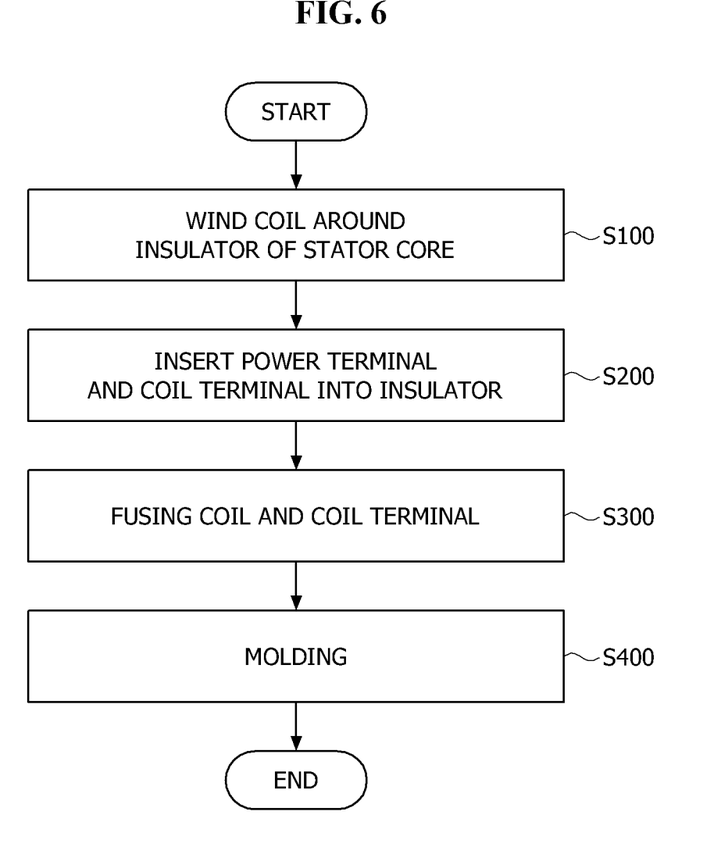
FIG. 6 is a flowchart illustrating a method of manufacturing a stator assembly according to an exemplary embodiment of the present invention.

FIG. 6 is a flowchart illustrating a method of manufacturing a stator assembly according to an exemplary embodiment of the present invention.

Referring to FIG. 6, the method of manufacturing the stator assembly according to the exemplary embodiment of the present invention may include following processes.

First, the coils 120 are wound around the insulator 140 of the stator core 110 (S100).

Next, the first power terminals 131 and the neutral terminals 132 are respectively inserted into the first slots 141 and the first slots 141 of the insulator 140 (S200).

Next, fusing is performed for the coils 120 and the neutral terminals 132 (S300).

Next, molding is performed to cover the bearings 133, the stator core 110, the coils 120, the neutral terminals 132, and the first power terminals 131 so that connection terminals of the first power terminals 131, connection terminals of the neutral terminal 132, and the holes 133a of the bearings 133 are exposed externally (S400).

Then, the second power terminal 134 may be connected to the first power terminal 131.

Hereinbefore, the stator assembly, the motor having the same, and the method of manufacturing the stator assembly according to the exemplary embodiment of the present invention have been described with reference to the accompanying drawings in detail.

In the above-described stator assembly, the motor having the same, and the method of manufacturing the stator assembly according to the exemplary embodiment of the present invention, since the bearings, the power terminals, and the neutral terminals in addition to the stator core and the coils are integrated by molding to make a single device with various components, the number of components is reduced, a structure thereof is simplified, and thereby providing an advantage for a simple assembly process. Further, a useless space can be removed by the above process, thereby providing advantages for reducing the size of a product and reducing the weight thereof.

Further, according to the exemplary embodiment of the present invention, the bearings, the power terminals, and the neutral terminals in addition to the coils are included in the stator body formed by the molding, thereby providing an advantage for preventing corrosion of or a short between the components therein.

Furthermore, according to the exemplary embodiment of the present invention, heat dissipation is possible through the stator body formed by the molding, thereby providing an advantage for improving the performance of heat dissipation of the motor.

Furthermore, according to the exemplary embodiment of the present invention, the bearings are fixed in the stator body formed by the molding, thereby providing an advantage for easy axial alignment.

The above description exemplarily describes the present invention and one skilled in the art may understand that the present invention can be variously modified into, changed to, and replaced with another concrete form without changing the essential features of the present invention. Therefore, the embodiments and accompanying drawings disclosed herein are for the purpose of describing the technical sprit of the present invention only and the scope of the technical sprit is not intended to be limited by the embodiments and accompanying drawings. The scope of the present invention is interpreted according to the scope of the appended claims, and all technical concepts equivalent to the foregoing are interpreted to be included within the scope of the present invention.

| DESCRIPTION OF REFERENCE NUMBERS | |
|---|---|
| 100: stator assembly | 133a: hole |
| 110: stator core | 134: second power terminal |
| 120: coil | 140: insulator |
| 130: stator body | 141: first slot |
| 131: first power terminal | 142: second slot |
| 131a: connection terminal | 200: rotor |
| 132: neutral terminal | 300: shaft |
| 133: bearing | |

What is claimed is:

1. A stator assembly comprising:
a stator core;
an insulator mounted on the stator core;
coils wound around the stator core to generate a rotating magnetic field; and
a stator body including a first power terminal, a plurality of second power terminals, a neutral terminal configured to connect to the coils and connect to the first power terminal, and a bearing, wherein each of the plurality of second power terminals comprises a central portion extending radially and two end portions connected with each end of the central portion wherein the two end portions extend circumferentially in opposite directions, at least one terminal of the plurality of second power terminals being connected to connection terminals of the first power terminal and at least one terminal of the plurality of second power terminals being connected to external power;
wherein the stator body is formed by performing molding, so that the coils, the first power terminal, the neutral terminal, the stator core, and the bearing are integrally included in the stator body formed by the molding so as to be a single device, wherein the connection terminals of the first power terminal and a hole of the bearing are exposed externally, and
wherein the insulator includes a first slot into which the first power terminal is inserted and a second slot into which the neutral terminal is inserted, and wherein a length of the first slot is smaller than a length of the second slot.

2. The stator assembly of claim 1, wherein the coils are wound around the insulator.

3. The stator assembly of claim 1, wherein the connection terminals of the first power terminal are exposed on an upper surface of the stator body.

4. The stator assembly of claim 3, wherein the stator body is formed by molding so that a hollow portion in communication with the hole of the bearing is formed.

5. The stator assembly of claim 3, wherein each of the plurality of second power terminals connected to the first power terminal is disposed on the upper surface of the stator body.

6. The stator assembly of claim 5, wherein the stator body is formed by molding so that a hollow portion in communication with the hole of the bearing is formed.

7. The stator assembly of claim 1, wherein the stator body is formed by molding so that a hollow portion in communication with the hole of the bearing is formed.

8. The stator assembly of claim 2, wherein the stator body is formed by molding so that a hollow portion in communication with the hole of the bearing is formed.

9. The stator assembly of claim 1, wherein the plurality of second power terminals includes at least two terminals connected to the first power terminal and at least one terminal connected to external power.

10. A motor comprising:
a stator assembly including a stator core, an insulator mounted on the stator core; coils wound around the stator core, a neutral terminal configured to connect a first power terminal and the coils, a plurality of second power terminals, and a bearing,
wherein each of the plurality of second power terminals comprises a central portion extending radially and two end portions connected with each end of the central portion wherein the two end portions extend circumferentially in opposite directions, at least one terminal of the plurality of second power terminals being connected to connection terminals of the first power terminal and at least one terminal of the plurality of second power terminals being connected to external power; and
wherein a stator body is formed by performing molding, so that the coils, the first power terminal, the neutral terminal, the stator core, and the bearing are integrally included in the stator body formed by the molding so as to be a single device, wherein the connection terminals of the first power terminal and a hole of the bearing are exposed externally,
a rotor disposed on an inner side of the stator assembly; and
a shaft coupled to the rotor,
wherein the insulator includes a first slot into which the first power terminal is inserted and a second slot into which the neutral terminal is inserted, and wherein a length of the first slot is smaller than a length of the second slot.

11. The motor of the claim 10, wherein the coils are wound around the insulator.

12. The motor of the claim 10, wherein the connection terminals of the first power terminal are exposed on an upper surface of the stator body.

13. The motor of the claim 12, wherein each of the second power terminals connected to the first power terminal is disposed on the upper surface of the stator body.

* * * * *